(12) United States Patent
Skipp et al.

(10) Patent No.: US 11,150,613 B2
(45) Date of Patent: Oct. 19, 2021

(54) CONFIGURABLE SAFETY LOGIC SOLVER

(71) Applicant: Sensia LLC, Houston, TX (US)

(72) Inventors: Peter Graham Skipp, Houston, TX (US); Allan Brian Rentcome, Houston, TX (US); Robert Terrill Gebert, Richmond, TX (US)

(73) Assignee: Sensia LLC, Houston, TX (US)

( * ) Notice: Subject to any disclaimer, the term of this patent is extended or adjusted under 35 U.S.C. 154(b) by 503 days.

(21) Appl. No.: 14/546,070

(22) Filed: Nov. 18, 2014

(65) Prior Publication Data

US 2016/0139570 A1 May 19, 2016

(51) Int. Cl.
*G05B 9/02* (2006.01)
*G05B 19/042* (2006.01)

(52) U.S. Cl.
CPC ............ *G05B 9/02* (2013.01); *G05B 19/0426* (2013.01); *G05B 2219/13106* (2013.01); *G05B 2219/23293* (2013.01); *G05B 2219/25067* (2013.01); *G05B 2219/31467* (2013.01)

(58) Field of Classification Search
CPC ........................................................ G05B 9/02
USPC ............................................................ 717/79
See application file for complete search history.

(56) References Cited

U.S. PATENT DOCUMENTS

| | | | | |
|---|---|---|---|---|
| 3,725,864 A * | 4/1973 | Clark | ................... | G06F 13/122 710/6 |
| 4,442,504 A * | 4/1984 | Dummermuth | ...... | G05B 19/052 710/264 |
| 4,521,871 A * | 6/1985 | Galdun | ............... | G06F 11/2038 700/82 |
| 4,591,973 A * | 5/1986 | Ferris, III | ............... | G06F 13/32 710/3 |
| 5,390,350 A * | 2/1995 | Chung | .................. | G06F 1/3203 713/322 |
| 5,522,044 A * | 5/1996 | Pascucci | ................. | G06F 9/465 707/E17.032 |
| 5,524,267 A * | 6/1996 | Chin | ....................... | G06F 13/22 710/15 |
| 5,594,471 A * | 1/1997 | Deeran | ............... | G06F 3/04886 178/18.03 |

(Continued)

OTHER PUBLICATIONS

European Search Report for EP Application No. 15195103 dated Mar. 21, 2016; 10 Pages.

(Continued)

*Primary Examiner* — Evral E Bodden
(74) *Attorney, Agent, or Firm* — Foley & Lardner LLP

(57) ABSTRACT

A control system may include a display device and a processor that receives one or more inputs from the display device. The processor may generate a cause and effect visualization to be depicted on the display device, such that the cause and effect visualization represents a cause and effect logic configured to control one or more operations of a first set of industrial devices based one or monitored conditions. The processor may receive the inputs via the display device, such that the inputs include one or more configuration settings associated with the operations of the first set of industrial devices, the monitored conditions, or any combination thereof. The processor may then control the one or more operations of the first set of industrial devices based on the cause and effect logic and the inputs.

19 Claims, 5 Drawing Sheets

(56) References Cited

U.S. PATENT DOCUMENTS

| | | | |
|---|---|---|---|
| 6,369,836 B1* | 4/2002 | Larson | G05B 19/0426 |
| | | | 715/763 |
| 6,448,982 B1 | 9/2002 | Klapper et al. | |
| 6,882,917 B2* | 4/2005 | Pillar | B60R 16/0315 |
| | | | 701/48 |
| 6,941,261 B1 | 9/2005 | Quinn | |
| 6,999,996 B2* | 2/2006 | Sunderland | F25B 49/022 |
| | | | 709/208 |
| 7,062,580 B2 | 6/2006 | Donaires | |
| 7,165,214 B2 | 1/2007 | Ishizaka | |
| 7,421,528 B1* | 9/2008 | Yin | H04L 12/56 |
| | | | 370/390 |
| 7,530,044 B2 | 5/2009 | Teig | |
| 7,756,621 B2* | 7/2010 | Pillar | A62C 27/00 |
| | | | 701/41 |
| 7,785,078 B2 | 8/2010 | Calamai | |
| 10,037,443 B2* | 7/2018 | Maturana | G06G 7/66 |
| 2004/0193290 A1 | 9/2004 | Ott et al. | |
| 2006/0253205 A1* | 11/2006 | Gardiner | G05B 15/02 |
| | | | 700/19 |
| 2006/0259203 A1* | 11/2006 | Cheemalapati | G06F 11/24 |
| | | | 700/298 |
| 2008/0177397 A1* | 7/2008 | Davlin | G05B 19/0421 |
| | | | 700/3 |
| 2013/0138227 A1 | 5/2013 | Gohr et al. | |
| 2014/0055158 A1* | 2/2014 | Whetsel | G01R 31/318547 |
| | | | 324/756.03 |

OTHER PUBLICATIONS

Fourth Chinese Office Action & Search Report; CN Application No. 201510795140; dated Aug. 14, 2019.

* cited by examiner

US 11,150,613 B2

CONFIGURABLE SAFETY LOGIC SOLVER

BACKGROUND

The present disclosure generally relates to a safety logic solver that may perform certain actions when certain situations or conditions are present. More specifically, the present disclosure is generally related to improved systems and techniques for configuring a safety logic solver.

Industrial systems in the automation industry, the petrochemical industry, the oil and gas industry, and the like are managed and operated using certain control and monitoring systems. A wide range of applications exist for these control and monitoring systems, such as powering a wide range of actuators, such as valves, electric motors, and so forth, the collection of data via sensors, the annunciation of alarms and the like. To perform these functions, typical control and monitoring systems may include one or more components, such as: programming terminals, controllers, input/output (I/O) modules, communication networks, and/or human-machine interface (HMI) terminals.

Generally, separate from the control and monitoring system, industrial systems may employ a safety logic solver or controller, such as a Safety Instrumented System (SIS), to control or manage certain safety operations of the industrial system. As such, the safety logic solver may include an engineered set of hardware and software controls that may control the operations of various devices in an industrial system when certain conditions are present. In this way, the safety logic solver may be used to bring an industrial system (e.g., plant or process) to a safe state when safe operating parameters are exceeded. To ensure that devices in industrial systems are operated safely, each safety function of a conventional safety logic solver may be individually programmed to perform a desired action under a given condition. Although these conventional safety logic solvers may be used to manage the operations of the devices within the industrial system, improved systems and methods for configuring the safety logic solvers are desirable.

BRIEF DESCRIPTION

In one embodiment, a control system may include a display device and a processor that receives one or more inputs from the display device. The processor may generate a cause and effect visualization to be depicted on the display device, such that the cause and effect visualization represents a cause and effect logic configured to control one or more operations of a first set of industrial devices based one or monitored conditions. The processor may receive the inputs via the display device, such that the inputs include one or more configuration settings associated with the operations of the first set of industrial devices, the monitored conditions, or any combination thereof. The processor may then control the one or more operations of the first set of industrial devices based on the cause and effect logic and the inputs.

In another embodiment, a system may include a display device, an input/output (I/O) module configured to communicate with at least one industrial device, and a processor. The processor may receive one or more configuration settings for a cause and effect visualization depicted on the display device, such that the configuration settings are associated with a cause and effect logic used to control an operation of the at least one industrial device. The processor may then control the operation of the at least one industrial device via the I/O module based on the cause and effect logic and the configuration settings.

In yet another embodiment, a non-transitory computer-readable medium may include computer-executable instructions that cause a processor to generate a blank cause and effect visualization to be depicted on a display device, such that the cause and effect visualization represents a cause and effect logic configured to control one or more operations of a device based one or monitored conditions and a logical function that corresponds to the cause and effect logic. The processor may then receive one or more configuration settings associated with the operations of the device, the monitored conditions, and the logical function. The processor may then control the one or more operations of device based on the cause and effect logic and the configuration settings.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, a conventional safety logic solver may be programmed to perform a certain set of desired actions given a certain condition. Generally, each desired action that the conventional safety logic solver performs is individually programmed onto the conventional safety logic solver. As such, configuring a conventional safety logic solver may be a time-consuming process that involves generating a programming code to enable the conventional safety logic solver to perform the desired functions, compiling the generated programming code, testing the operations of the conventional safety logic solver, and the like.

Although it may be useful to customize the operations of the conventional safety logic solver to perform a number of functions, most users of a safety logic solver may have use for just a certain set of desired functions. Moreover, by programming each individual conventional safety logic solver, the costs associated with the conventional safety logic solver and the time associated with commissioning the conventional safety logic solver may be significant.

Keeping the foregoing in mind, in certain embodiments, a safety logic solver may include a pre-defined set of functions that may be configured using a human machine interface (HMI), a graphical user interface (GUI), or the like of the respective safety logic solver. As such, a user may configure the safety logic solver to perform certain actions based on industrial devices communicatively coupled to input and output modules of the safety logic solver. By enabling the user to configure the safety logic solver via the HMI, as opposed to by generating specific codes for each function of the safety logic solver, the user may be able to commission or begin the operation of the safety logic solver more quickly as compared to conventional safety logic solvers.

Figure 1:
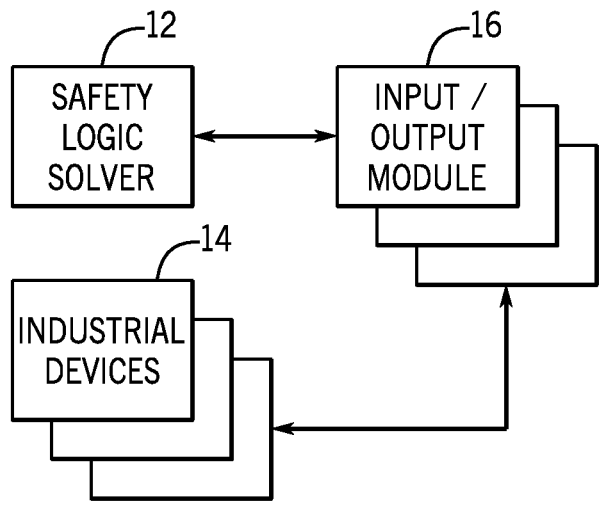
FIG. 1 illustrates a block diagram of a safety logic solver and industrial devices communicatively coupled to the safety logic solver, in accordance with an embodiment.

By way of introduction, FIG. 1 illustrates a block diagram of a safety logic solver 12 communicatively coupled to one or more industrial devices 14. As discussed above, the safety logic solver 12 may be Safety Instrumented System (SIS) that may perform specific control functions to failsafe or maintain safe operation of a process being performed by the industrial devices 14 when certain (e.g., unacceptable or dangerous) conditions occur.

In order to be aware of various conditions of an industrial system, a group of industrial devices 14, or a single industrial device 14, the safety logic solver 12 may receive inputs from various field devices or sensors capable of detecting operating conditions of the respective industrial system, group of industrial devices 14, or single industrial device 14 via input/output (I/O) modules 16. The I/O modules 16 may enable the safety logic solver 12 to communicate with sensors, industrial devices 14, and the like. The sensors may measure certain operating conditions associated with a process being performed by the industrial device 14, the industrial device 14 itself, and the like.

The I/O modules 16 may also enable the safety logic solver 12 to control the operations of various field devices, the industrial devices 14, annunciators, alarms, and the like. That is, the safety logic solver 12 may control the output or operations of certain devices via the I/O modules 16. For instance, the I/O modules 16 may enable the safety logic solver 12 to communicate with various types of valves, such that the valves may be opened and closed via the safety logic solver 12.

In one embodiment, the I/O modules 16 may include universal or flexible inputs. For instance, each input of the I/O module 16 may be configured as an analog input or a digital input. In the same manner, the I/O modules 16 may have flexible digital outputs, such that each output may be wired as a dry contact or a powered output.

Figure 2:
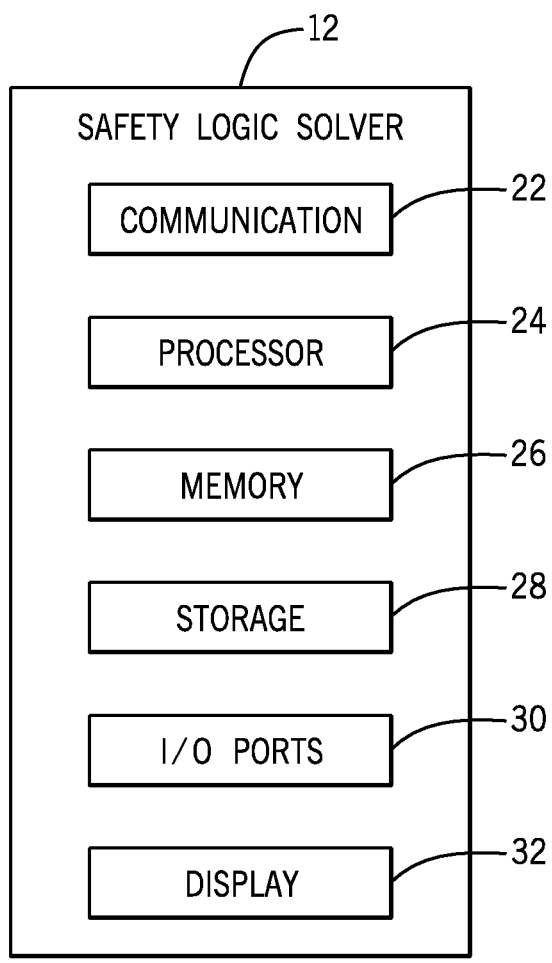
FIG. 2 illustrates a block diagram of components part of the safety logic solver of FIG. 1, in accordance with an embodiment.

The safety logic solver 12 may be any suitable computing device that may communicate with the industrial devices 14 via the I/O modules 16. For example, FIG. 2 illustrates a block diagram of various components that may be part of the safety logic solver 12 and may be used by the safety logic solver 12 to perform control operations of various industrial devices 14. As shown in FIG. 2, the safety logic solver 12 may include a communication component 22, a processor 24, a memory 26, a storage 28, input/output (I/O) ports 30, a display 32, and the like.

The communication component 22 may be a wireless or wired communication component that may facilitate communication between different safety logic solver 12, industrial devices 14, and the like. The processor 24 may be any type of computer processor or microprocessor capable of executing computer-executable code. The memory 26 and the storage 28 may be any suitable articles of manufacture that can serve as media to store processor-executable code, data, or the like. These articles of manufacture may represent computer-readable media (i.e., any suitable form of memory or storage) that may store the processor-executable code used by the processor 24 to perform the presently disclosed techniques. The memory 26 and the storage 28 may also be used to store data received via the I/O ports 30, data analyzed by the processor 24, or the like.

The I/O ports 30 may be interfaces that may couple to various types of I/O modules 16 such as sensors, programmable logic controllers (PLC), and other types of equipment. For example, the I/O ports 30 may serve as an interface to pressure sensors, flow sensors, temperature sensors, and the like via the I/O modules 16.

The display 32 may include any type of electronic display such as a liquid crystal display, a light-emitting-diode display, and the like. As such, data acquired via the I/O ports 30 and/or data analyzed by the processor 24 may be presented on the display 32. In certain embodiments, the display 32 may be a touch screen display or any other type of display capable of receiving inputs from the operator. As such, the display 32 may receive inputs to configure the operation of the safety logic solver 12. That is, an operator of the safety logic solver 12 may use the display 32 to select certain inputs to monitor and certain outputs to be performed when certain conditions are present at the inputs. Additional details regarding the configuration of the safety logic solver 12 will be discussed below with reference to FIGS. 5 and 6.

Figure 3:
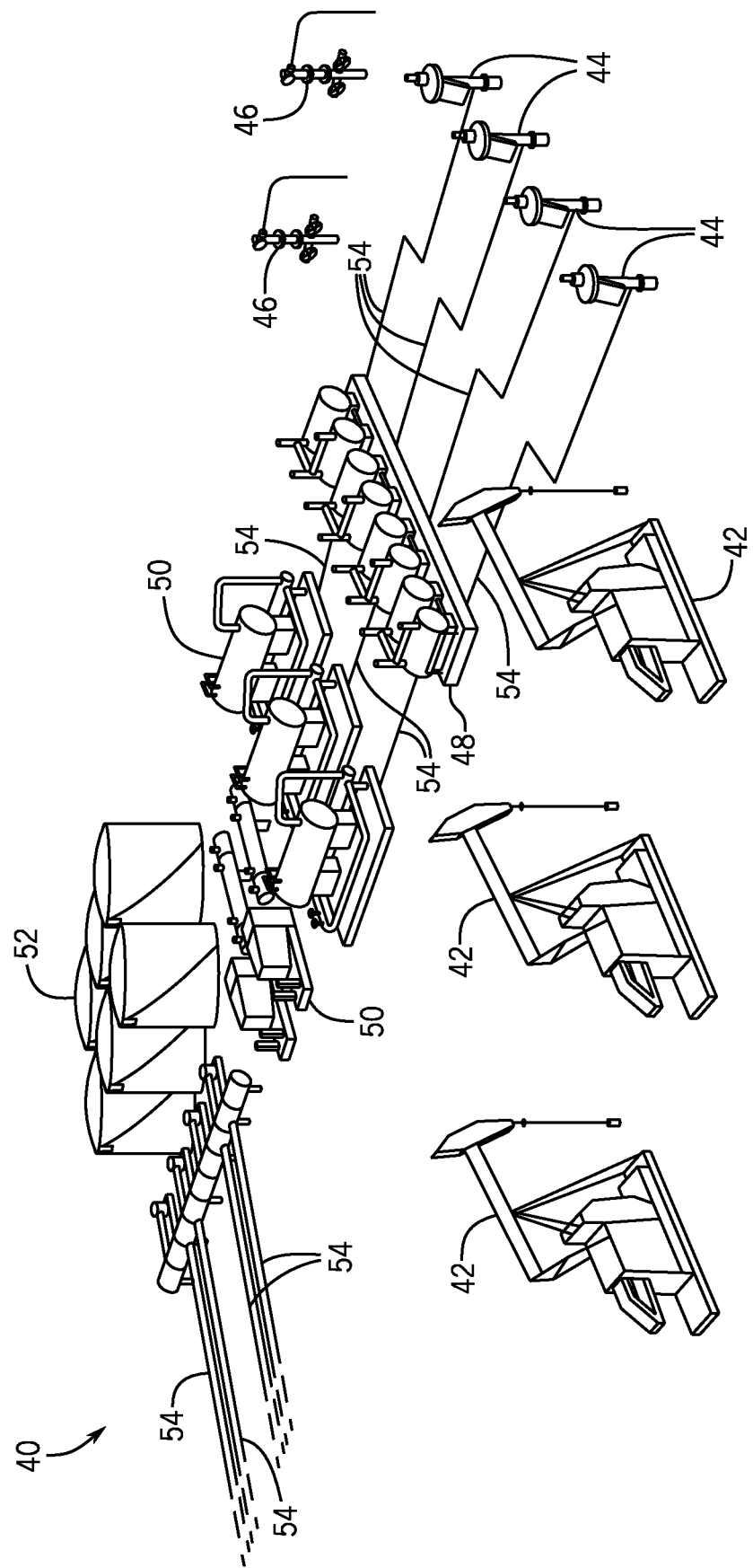
FIG. 3 illustrates a schematic diagram of an example hydrocarbon site that may include industrial devices being monitored and controlled by the safety logic solver of FIG. 1, in accordance with embodiments presented herein.

With the foregoing in mind, FIG. 3 illustrates a schematic diagram of an example hydrocarbon site 40 that may include example industrial devices being monitored and controlled by the safety logic solver 12. Referring now to FIG. 3, the hydrocarbon site 40 may be an area in which hydrocarbons, such as crude oil and natural gas, may be extracted from the ground, processed, and stored. As such, the hydrocarbon site 40 may include a number of wells and a number of well devices that may control the flow of hydrocarbons being extracted from the wells. In one embodiment, the well devices at the hydrocarbon site 40 may include any device equipped to monitor and/or control production of hydrocarbons at a well site. As such, the well devices may include pump jacks 42, submersible pumps 44, well trees 46, and the like. After the hydrocarbons are extracted from the surface via the well devices, the extracted hydrocarbons may be distributed to other devices such as wellhead distribution manifolds 48, separators 50, storage tanks 52, and the like.

At the hydrocarbon site 40, the pump jacks 42, submersible pumps 44, well trees 46, wellhead distribution manifolds 48, separators 50, and storage tanks 52 may be connected together via a network of pipelines 54. As such, hydrocarbons extracted from a reservoir may be transported to various locations at the hydrocarbon site 40 via the network of pipelines 54.

The pump jack 42 may mechanically lift hydrocarbons (e.g., oil) out of a well when a bottom hole pressure of the well is not sufficient to extract the hydrocarbons to the surface. The submersible pump 44 may be an assembly that may be submerged in a hydrocarbon liquid that may be pumped. As such, the submersible pump 44 may include a hermetically sealed motor, such that liquids may not penetrate the seal into the motor. Further, the hermetically sealed motor may push hydrocarbons from underground areas or the reservoir to the surface.

The well trees 46 or Christmas trees may be an assembly of valves, spools, and fittings used for natural flowing wells. As such, the well trees 46 may be used for an oil well, gas well, water injection well, water disposal well, gas injection well, condensate well, and the like. The wellhead distribution manifolds 48 may collect the hydrocarbons that may have been extracted by the pump jacks 42, the submersible pumps 44, and the well trees 46, such that the collected hydrocarbons may be routed to various hydrocarbon processing or storage areas in the hydrocarbon site 40.

The separator 50 may include a pressure vessel that may separate well fluids produced from oil and gas wells into separate gas and liquid components. For example, the separator 50 may separate hydrocarbons extracted by the pump jacks 42, the submersible pumps 44, or the well trees 46 into oil components, gas components, and water components. After the hydrocarbons have been separated, each separated component may be stored in a particular storage tank 52. The hydrocarbons stored in the storage tanks 52 may be transported via the pipelines 54 to transport vehicles, refineries, and the like.

In certain embodiments, the industrial devices of the hydrocarbon site 40, such as the pump jacks 42, the submersible pumps 44, the well trees 46, the wellhead distribution manifolds 48, the separator 50, and the like, may be coupled to the safety logic solver 12. As such, the safety logic solver 12 may monitor various operating conditions of the respective device, and perform certain actions when the operating conditions are not within an expected range or value.

Figure 4:
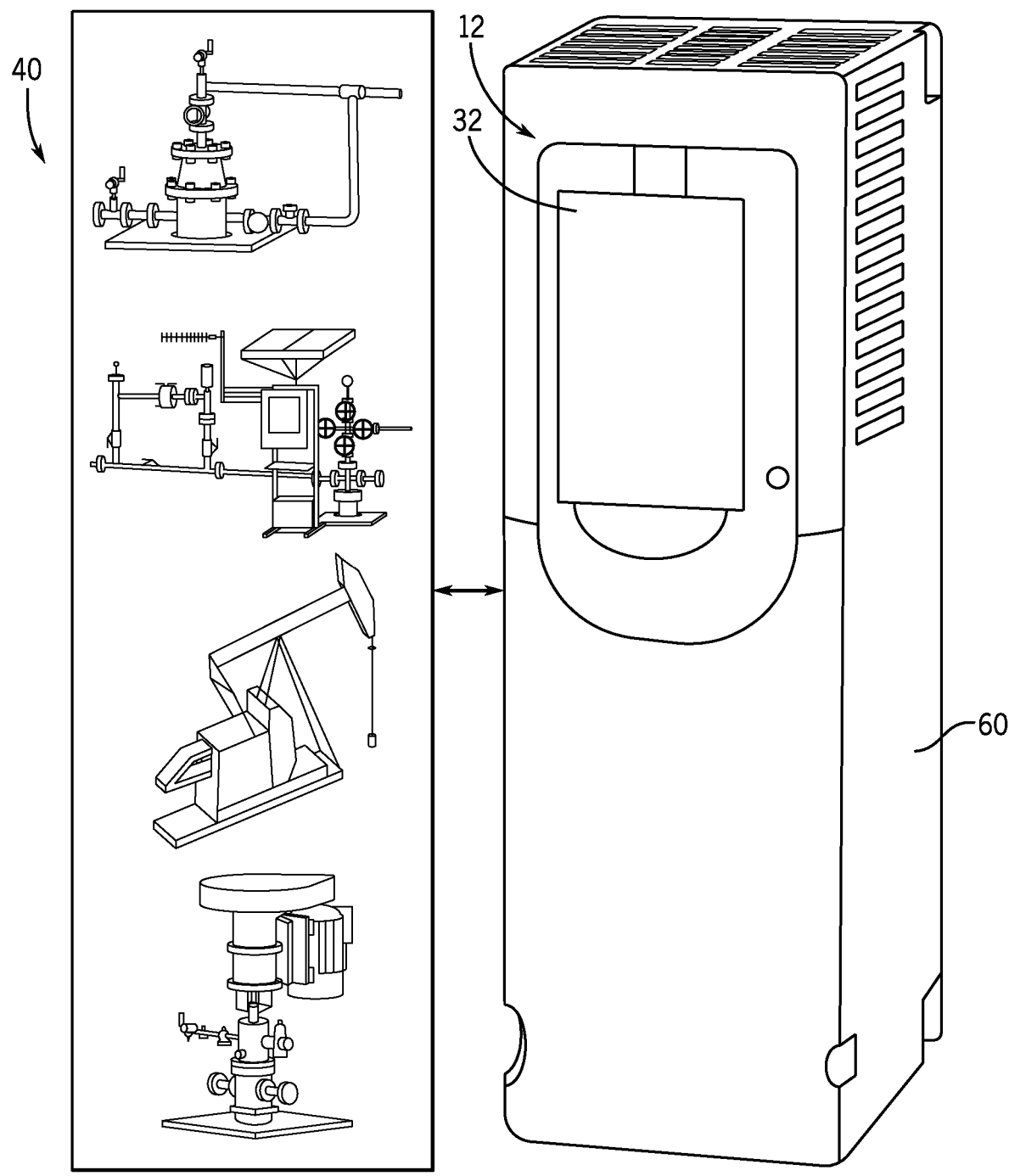
FIG. 4 illustrates an example perspective view of the safety logic solver of FIG. 1 and example industrial devices communicatively coupled therewith, in accordance with an embodiment.

In one embodiment, the safety logic solver 12 may be part of an enclosure 60 as depicted in FIG. 4. The enclosure 60 may be positioned within a close vicinity to a respective industrial device such that I/O modules 16 may be disposed within the enclosure. The I/O modules 16 may receive data from sensors associated with various input devices (e.g., devices in hydrocarbon site 40, sensors on devices), detecting certain ambient conditions (e.g., temperature), and the like. The I/O modules 16 may also be communicatively coupled to certain output devices, such as alarms, annunciators, valves, and the like.

The safety logic solver 12 may include a certain number (e.g., 50, 100, 150, 200) of I/O modules 16 that may be coupled to input devices and/or output devices. In one embodiment, the display 32 of the safety logic solver 12 may depict a cause/effect visualization that may be used to configure the operation of the output devices based on inputs received via the input devices. That is, an operator may specify certain input devices to monitor and certain output devices to perform certain actions in response to various monitored conditions of the input devices. As such, the monitored conditions may represent a cause portion of the cause/effect visualization and the output devices may represent an effect portion of the cause/effect visualization. In other words, the conditions monitored or data acquired by the input devices specified in the cause portion of the cause/effect visualization may cause certain output devices to perform certain actions (effects).

Figure 5:
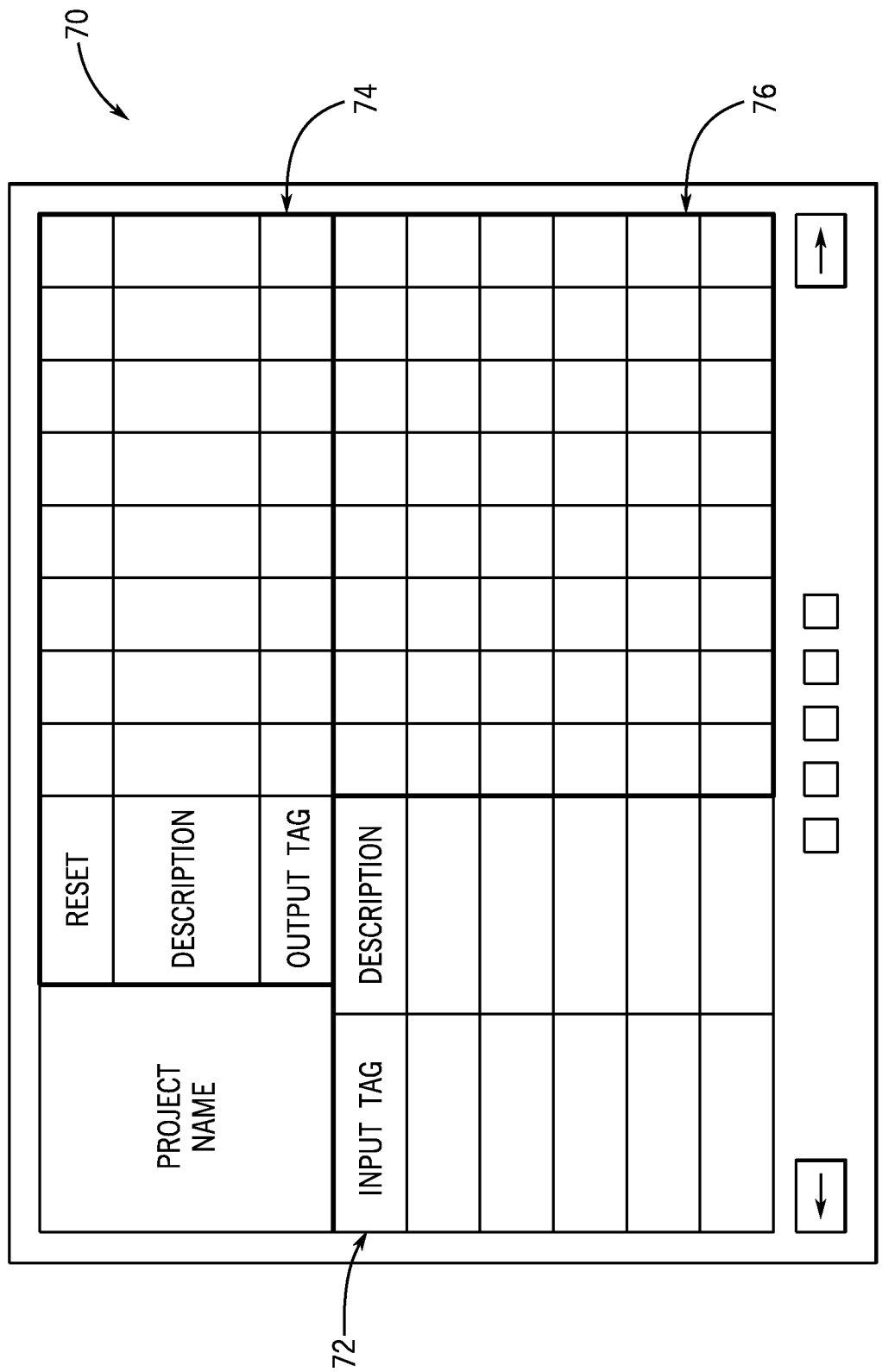
FIG. 5 illustrates an example screen shot of a display that corresponds to the safety logic solver of FIG. 1, in accordance with an embodiment.

Keeping the foregoing in mind, FIG. 5, for example, illustrates a blank cause/effect visualization 70 that may be depicted on the display 32 of the safety logic solver 12. The cause/effect visualization 70 may be a matrix that includes input tag fields 72, output tag fields 74, and logic function fields 76. The input tag fields 72 may correspond to the cause portion and the output tag fields 74 may correspond to the effect portion discussed above.

When configuring the safety logic solver 12, an operator may initialize the input tag fields 72, the output tag fields 74, and the logic function fields 76. As such, in one embodiment, the operator may initialize the input tag fields 72 by touching the input tag fields 72 on the display 32 or by using a component (e.g., keypad) to select the respective input tag field 72. After selecting a respective input tag field 72, the operator may specify an I/O module 16 that may be used as an input device in a cause/effect logic to be implemented using the specified I/O module 16. In the same manner, the operator may specify an I/O module 16 that may be used as an output device or to send a signal to an output device (e.g., valve) based on a condition of the input I/O module 16.

The logic function fields 76 may be used to specify logic commands or functions that may implement certain cause/effect logic. For example, an operator may provide commands, such as OR ("X"), OR (negated input–"/X"), 2ooN (two-out-of-N voting logic–("2(ooN)"), AND ("&"), AND (negated input–"/&"), Timer On Delay ("Ton"), Timer Off Delay ("Toff"), Reset ("R"), Reset (negated input–"/R"), Enable ("E"), Enable (negated input–"/E"), and the like, into the logic function fields 76. Generally, the safety logic solver 12 may perform the functions specified by the entered logic commands according to the intersection between input tag fields 72, the output tag fields 74, and the logic function fields 76.

By way of example, Table 1 provides an example cause/effect matrix that includes inputs A-D and outputs 1-4. As shown in Table 1, the input tag fields 72 may correspond to the first column of the table and the output tag fields 74 may correspond to the first row of the table. The intersecting cells between the first column and the first row of the table may correspond to the logic function fields 76.

TABLE 1

Sample Cause/Effect Matrix

|  | Output 1 | Output 2 | Output 3 | Output 4 |
| --- | --- | --- | --- | --- |
| Input A | X | 2 | & | E |
| Input B | X | 2 | & | E |
| Input C | /X | 2 | X | X |
| Input D | /X | X | X | X |

According to the Cause/Effect matrix of Table 1, each output may be defined as follows:
Output 1=A OR B OR (NOT C) OR (NOT D)
Output 2=(A, B, C, Voted 2oo3) OR D
Output 3=(A AND B) OR (C OR D)
Output 4=(A AND B) AND (C OR D)

As shown above, the safety logic solver 12 may implement the logic functions defined in the logic functions fields 76 based on the selected logic functions, the corresponding inputs, and the corresponding outputs. By providing the cause/effect visualization 70 on the display 32, the operator may then program the safety logic solver 12 using the HMI without having to individually program a number of programmable logic units to perform the desired functions of a specified cause/effect matrix.

Referring back to FIG. 5, the input tag fields 72 may include certain details to reference a particular I/O module 16 being specified in a corresponding input tag field 72. In one example, the input tag fields 72 may include an input tag field that may be a name used to characterize the I/O module 16 being used as an input and a description field that may describe the respective input I/O module 16. In the same manner, the output tag fields 74 may also include an output tag field to characterize the I/O module 16 being used as an output and a description field that may describe the respective output I/O module 16.

In certain embodiments, the operator may specify the input I/O modules 16, the output I/O modules 16, and the logic functions within the cause/effect visualization 70 to program the operation of the safety logic solver 12. Before specifying the input and output I/O modules 16, the operator may build a representation of a number of I/O modules 16 accessible by the safety logic solver 12 to be stored in the memory 26 of the safety logic solver 12. For example, the operator may provide a tag name that corresponds to the I/O module 16, a signal type that corresponds to the I/O module 16, a field tag name that corresponds to the I/O module 16, a description of the I/O module 16, an option to force enable the corresponding I/O module 16, a force value to set the corresponding I/O module 16, and the like. In addition to these features, the operator may specify maximum and minimum engineering units, alarm set points, alarm hysteresis, alarm filter times, and the like for various data fields associated with the I/O modules 16.

In addition to defining the representations for the I/O modules 16, the operator may also specify a condition to monitor for the input I/O module 16 and an action to be performed by the output I/O module 16. For example, the condition to monitor may include monitoring data being acquired by the I/O module 16 with respect to some threshold. Moreover, the action to be performed by the output I/O module 16 may correspond to sending signals to industrial devices such as valves, pumps, the devices of the hydrocarbon site 40, and the like to control their respective operations.

After building the representation for the I/O module 16 and defining conditions and/or actions for the I/O modules 16, the safety logic solver 12 may store a profile for the respective I/O module 16 in the memory 26 or the storage 28 of the safety logic solver 12. As such, the operator may quickly access various I/O module 16 representations and place the representation in the cause/effect matrix with ease.

Figure 6:
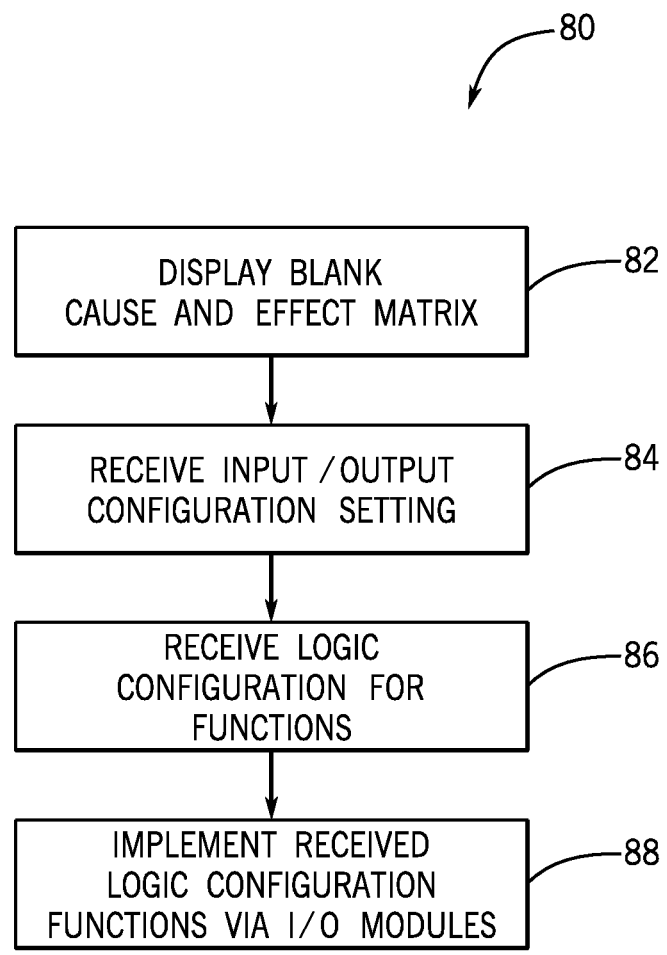
FIG. 6 illustrates a flow chart of a method for configuring the safety logic solver of FIG. 1 via a graphical user interface, in accordance with an embodiment.

Keeping the foregoing in mind, FIG. 6 illustrates a flow chart of a method 80 for configuring or programming the safety logic solver 12 via a HMI or the display 32 of the safety logic solver 12. Referring now to FIG. 6, at block 82, the safety logic solver 12 may generate a blank cause/effect matrix visualization for display on the display 32. The blank cause/effect matrix visualization may correspond to the cause/effect visualization 70 of FIG. 5.

At block 84, the safety logic solver 12 may receive input and output configuration settings from an operator. In one embodiment, the operator may provide the input and output configuration settings via the display 32, which may be touch-screen display that provides inputs to the processor 24 of the safety logic solver 12. Although the method 80 is described herein as having the safety logic solver 12 receive inputs via the display 32, it should be noted that the safety logic solver 12 may also receive inputs via any suitable device such as a keyboard, keypad, mouse, or the like.

In another embodiment, the safety logic solver 12 may receive inputs via another computing device. That is, the operator may configure the cause/effect matrix visualization in a separate computing device from the safety logic solver 12 in an offline mode. The safety logic solver 12 may then receive the configuration of the cause and effect logic created in the offline mode via the separate computing device. As such, the safety logic solver 12 may download configuration data regarding the configuration of the safety logic solver 12.

The input and output configuration settings may correspond to specifying certain I/O modules 16 to be used as input devices in the input tag fields 72 and certain I/O modules 16 to be used as output devices in the output tag fields 74. In one embodiment, the input tag fields 72 and the output tag fields may be preconfigured based on I/O modules 16 that may be stored within the enclosure 60 housing the safety logic solver 12 and the I/O modules 16 or that may be communicatively coupled to the safety logic solver 12. In any case, however, the number of I/O modules 16 that may be used may be limited to some predetermined number (e.g., 50, 100, 150, 200, 250) of modules to enable the safety logic solver 12 to be easily configurable via the display 32.

At block 86, the safety logic solver 12 may receive logic configuration functions from the operator via the display 32. As discussed above, the operator may identify certain inputs to monitor and certain outputs to be performed based on the conditions of the identified inputs. For example, one input tag field 72 may correspond to a pressure sensor and one output tag field 74 may correspond to a shutdown valve. The operator may place an OR (e.g., X) logic function in the logic function field 76 that intersects the selected input and output to cause the safety logic solver 12 to close the shutdown valve when the pressure sensor is above some threshold. In certain embodiments, the safety logic solver 12 may store the created cause/effect matrix in the memory 26, the storage 28, and the like. As such, the configuration of the safety logic solver 12 may be retrieved at any time.

After receiving the configuration settings and logic functions at blocks 84 and 86, the safety logic solver 12 may implement the cause/effect logic based on the monitored input conditions, the programmed logic functions, and the corresponding output actions. That is, the safety logic solver 12 may continuously monitor the conditions associated with the input tag fields 72 with respect to the logic function fields 74 associated with each input tag field 72. The safety logic solver 12 may then perform actions (e.g., send signals, annunciate alarms) that correspond to an output tag field 74 associated with the logic function fields 76 that intersect the respective input tag fields 72. In this manner, the safety logic solver 12 may be programmed via the display 32 and placed into operation without individually programming each individual cause and effect operation of the cause and effect matrix.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:
1. A control system, comprising:
 a touch screen display device;
 a memory;
 an online control device;

one or more input/output (I/O) modules configured to enable the control system to communicate with at least one industrial device; and a processor configured to receive one or more inputs from the touch screen display device, wherein the processor is configured to:

generate a cause and effect visualization offline to be depicted on the touch screen display device, wherein the cause and effect visualization represents a cause and effect logic configured to control one or more operations of a set of industrial devices based on a plurality of monitored conditions;

detect the one or more I/O modules being communicatively coupled to the processor;

identify one of the one or more I/O modules communicatively coupled to the processor;

retrieve a profile of the one of the one or more I/O modules from the memory comprising a plurality of profiles associated with a plurality of I/O modules, wherein each profile of the plurality of profiles comprises:

a condition of the plurality of monitored conditions determined based on data acquired via a respective I/O module of the one or more I/O modules; and an action that the respective I/O module of the plurality I/O modules is configured to perform in response to the condition being present;

wherein the condition and the action are combined to generate cause and effect logic for one of the one or more I/O modules;

generate a first set of configuration settings associated with the cause and effect logic based on the condition and the action of the profile, wherein the first set of configuration settings is configured to control the one or more operations of the set of industrial devices based on the condition, the action, and the cause and effect logic;

receive the one or more inputs via the touch screen display device, wherein the touch screen display device is configured to receive one or more inputs, the one or more inputs based on selection of the plurality of profiles comprising various I/O module representations and associated with the plurality of I/O modules such that one of the plurality of profiles can be selected and placed into the cause and effect visualization to generate the one or more inputs; and provide the inputs and cause and effect logic to the online control device;

wherein the online control device is configured to:

provide control signals based on the one or more received inputs and the cause and effect logic thereby generating a second set of configuration settings; and control the one or more operations of the set of industrial devices based on the cause and effect logic and the second set of configuration settings.

2. The control system of claim 1, wherein the one or more I/O modules are configured to receive the plurality of monitored conditions associated with the set of industrial devices.

3. The control system of claim 1, wherein the one or more I/O modules are configured to monitor one or more conditions associated with an additional set of industrial devices different from the set of industrial devices.

4. The control system of claim 1, wherein the one or more I/O modules are configured to monitor one or more conditions associated with ambient conditions of an environment.

5. The control system of claim 1, wherein the action comprises sending one or more signals to the set of industrial devices, wherein the one or more signals are configured to control the one or more operations of the set of industrial devices.

6. A system, comprising:

a touch screen display device;

a memory;

an input/output (I/O) module configured to enable the system to communicate with at least one industrial device; and a processor configured to:

generate a cause and effect visualization offline to be depicted on the touch screen display device, wherein the cause and effect visualization represents a cause and effect logic configured to control one or more operations of a set of industrial devices;

detect the I/O module being communicatively coupled to the processor;

identify the I/O module in response to detecting the I/O module being communicatively coupled to the processor;

retrieve a profile of the I/O module from the memory comprising a plurality of profiles associated with a plurality of I/O modules, wherein each profile of the plurality of profiles comprises:

a condition of a plurality of monitored conditions determined based on data acquired via a respective I/O module;

and an action that the respective I/O module is configured to perform in response to the condition being present;

wherein the condition and the action are combined to generate cause and effect logic for the I/O module;

receive the one or more inputs via the touch screen display device, wherein the touch screen display device is configured to receive one or more inputs, the one or more inputs based on selection of the plurality of profiles comprising various I/O module representations and associated with the plurality of I/O modules such that one of the plurality of profiles can be selected and placed into the cause and effect visualization to generate the one or more inputs; and provide the inputs and cause and effect logic to an online control device;

wherein the online control device is configured to:

provide control signals based on the received inputs and cause and effect logic;

generate one or more configuration settings for a cause and effect visualization depicted on the touch screen display device based on the condition and the action of the profile, wherein the one or more configuration settings are configured to control an operation of the at least one industrial device based on the condition and the action, and the cause and effect logic; and control the operation of the at least one industrial device via the I/O module based on the cause and effect logic and the one or more configuration settings.

7. The system of claim 6, wherein the I/O module is configured to receive data from one or more sensors associated with the at least one industrial device.

8. The system of claim 6, wherein the at least one industrial device comprises a pump jack, a pump, a well tree, or a valve.

9. The system of claim 6, wherein the one or more configuration settings comprise a logic function field configured to specify an implementation of the cause and effect logic based on the condition.

10. The system of claim 9, wherein the logic function field is configured to receive an OR command, a negated OR command, a two-out-of-N voting logic command, an AND command, a negated AND command, a Timer On Delay command, a Timer Off Delay command, a Reset command, a negated-input Reset command, an Enable command, or a negated-input Enable command.

11. The system of claim 9, wherein the cause and effect logic is implemented based on:
an intersection between an input tag field and an output tag field in the cause and effect visualization; and
an entry in the logic function field located at the intersection, wherein the action and the condition are associated with the logic function field.

12. The system of claim 6, wherein the profile comprises a tag name associated with the condition and a description of the condition.

13. The system of claim 6, wherein the touch screen display device, the I/O module, and the processor are within an enclosure.

14. A non-transitory computer-readable medium, comprising computer-executable instructions configured to cause a processor to:
generate a blank cause and effect visualization offline to be depicted on a touch screen display device, wherein the cause and effect visualization represents a cause and effect logic configured to control one or more operations of a device based on a plurality of monitored conditions and a logical function that corresponds to the cause and effect logic;
detect the I/O module being communicatively coupled to the processor;
identify an input/output (I/O) module, wherein the identified I/O module is configured to enable the processor to communicate with the device;
retrieve a profile of the I/O module from a memory communicatively coupled to the processor comprising a plurality of profiles associated with a plurality of I/O modules, wherein each profile of the plurality of profiles comprises:
a condition of the plurality of monitored conditions determined based on data acquired via a respective I/O module; and
an action that the respective I/O module is configured to perform in response to the condition being present;
wherein the condition and the action are combined to generate cause and effect logic for the I/O module;
receive the one or more inputs via the touch screen display device, wherein the touch screen display device is configured to receive one or more inputs, the one or more inputs based on selection of the plurality of profiles comprising various I/O module representations and associated with the plurality of I/O modules such that one of the plurality of profiles can be selected and placed into the cause and effect visualization to generate the one or more inputs;
provide the one or more inputs and cause and effect logic to an online controller;
generate, via the online controller, one or more configuration settings configured to control the one or more operations of the device based on the condition, the action, and the logical function; and
control, via the online controller, the one or more operations of the device based on the cause and effect logic and the one or more configuration settings.

15. The non-transitory computer-readable medium of claim 14, wherein the touch screen display device is a graphical user interface (GUI).

16. The non-transitory computer-readable medium of claim 14, wherein the blank cause and effect visualization is configured to incorporate a predetermined number of input/output modules associated with the plurality of monitored conditions or the one or more operations of the device.

17. The non-transitory computer-readable medium of claim 14, wherein the device comprises an alarm or an annunciator.

18. The non-transitory computer-readable medium of claim 14, wherein the plurality of monitored conditions are associated with data received from one or more sensors.

19. The control system of claim 1, wherein the second set of configuration settings is configured to specify an implementation of the cause and effect logic based on the first set of configuration settings.

* * * * *